7007X
NO PRINTED SPECIFICATION AVAILABLE
G. H. Duffey,
Cock,
Patented Apr. 19, 1832.
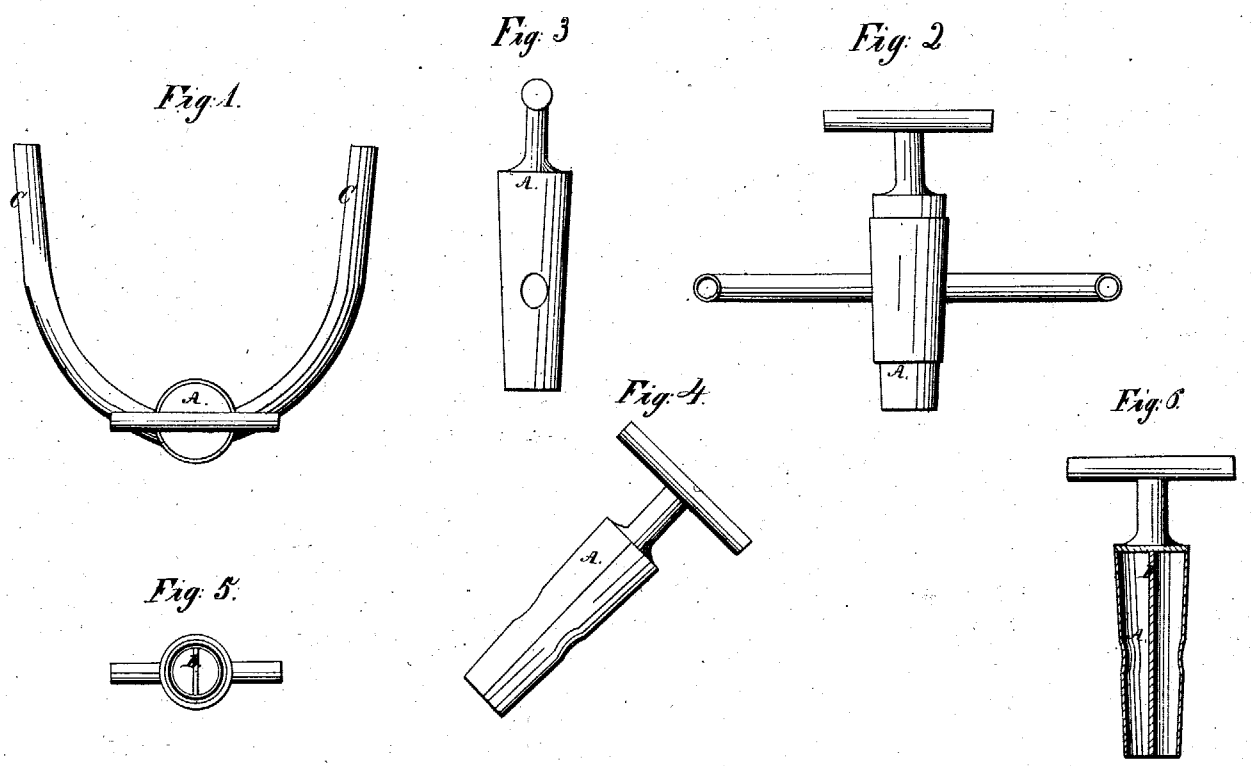

7007X Apl 19, 1832

George H. Duffey. of Alexandria. State of Virginia

Letters Patent.

The schedule referred to in these Letters Patent and making part of the same containing a description in the words of the said George H. Duffey himself of his improvement in the mode of drawing Soda and other Mineral water Be it known that I George H. Duffey of the town of Alexandria County of Alexandria and State of Virginia. have made an improvement in the mode of drawing Soda. and other Mineral Waters which is described as follows, The soda having been put in one vessel and the Tartaric acid in another, a pipe is made to lead to the barrel or tube of the cock for drawing off the liquid. –

The key or tube of the cock is divided in the middle into two equal parts by a partition reaching from the top to the bottom, two holes or openings are made, one leading into each division, they may be of an equal or unequal size. These openings must be made to correspond with the openings in the tubes leading into the barrel, —— Operation.

The soda having been put in one vessel & the tartaric acid in the other they are conveyed to the barrel of the cock; the key being turned, till the openings in it and the mouths of the pipes or tubes correspond, the soda flows down one division in the key, and the tartaric acid down the other, and they are not united till they meet in the glass or vessel put to receive them, Soda water is thus drawn off. Any other two liquids requiring not to be united till they come into the vessel prepared to receive them can of course be drawn off in the same way. — By making the mouths of the tubes that convey the liquids to the barrel of the cocks of different sizes, and the holes in the key to correspond with them the two liquids can be drawn off in any required proportions. Invention. The improvement here claimed consists in making the divisions and openings in the tube of the key, to that liquids may be conveyed down each division separately, and not unite until they meet in the glass or vessel for receiving them; whereas the method lately patented and now in use for drawing soda water by means of a compound Cock, is to suffer the two liquids to unite in the cock, whereby the stronger liquid is forced up the tube of the weaker; and the whole spoiled. Further to illustrate my invention I refer to the model & drawing of the same deposited in the Patent Office.—

In testimony that the above is a full description of my invention, I have subscribed my name before two Witnesses Witnesses
Wm. P. Elliot
Willm. Hebb.

George H. Duffey.

Exd.
W.J.C.

(585 words)

(Patented April 19, 1832)